J. GASSER.
DUMP WAGON.
APPLICATION FILED JUNE 4, 1921.
1,431,942.
Patented Oct. 17, 1922.
3 SHEETS—SHEET 1.
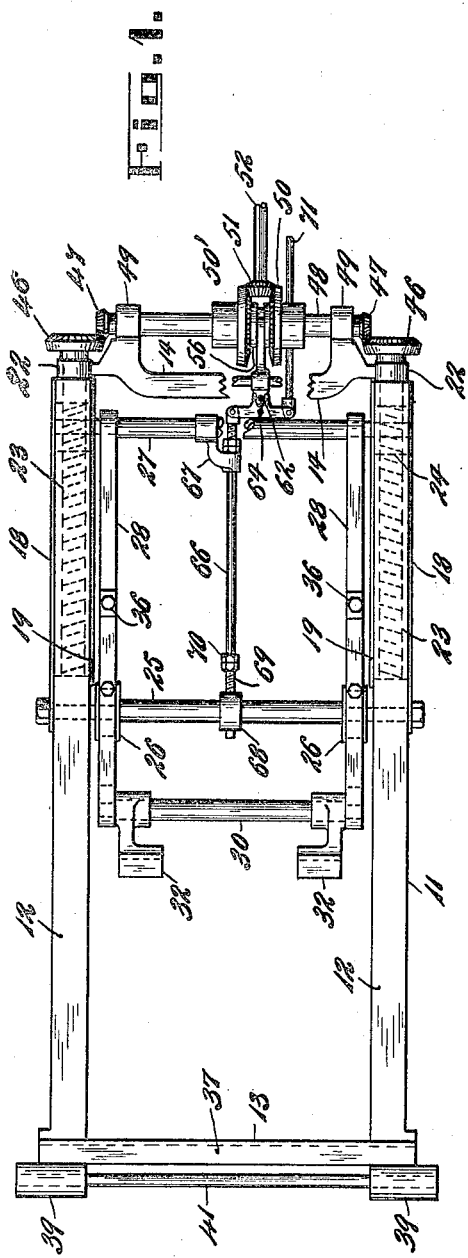
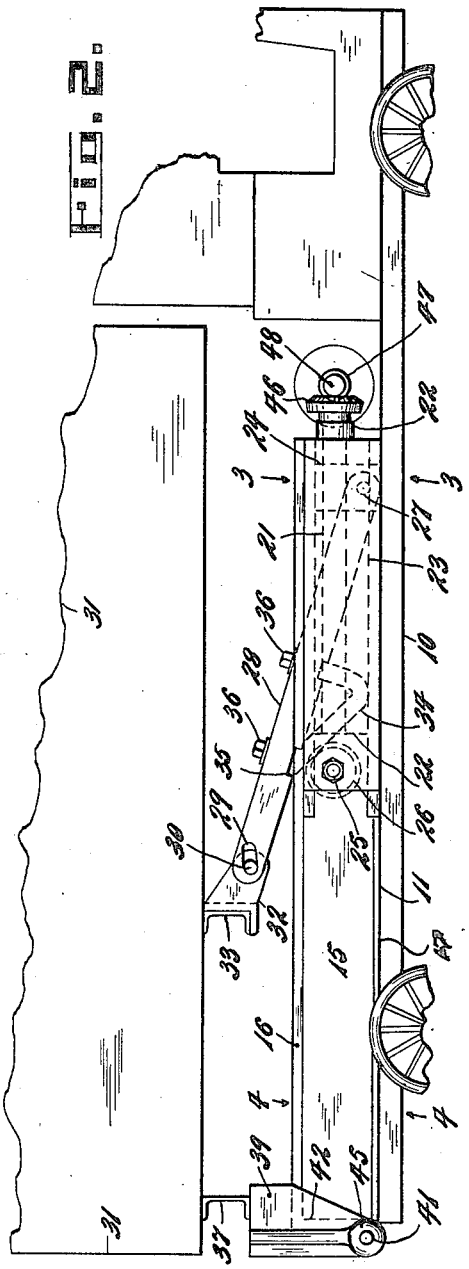
Joseph Gasser
INVENTOR
BY Victor J. Evans
ATTORNEY
Alfred T. Bratton
WITNESS:

J. GASSER.
DUMP WAGON.
APPLICATION FILED JUNE 4, 1921.
1,431,942. Patented Oct. 17, 1922.
3 SHEETS—SHEET 2.
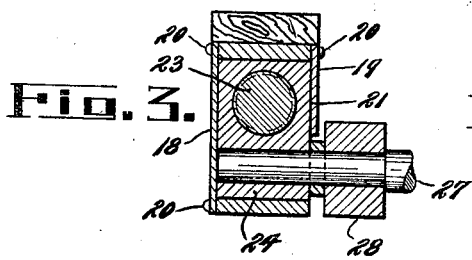
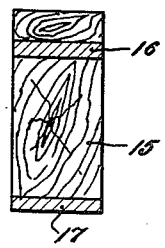
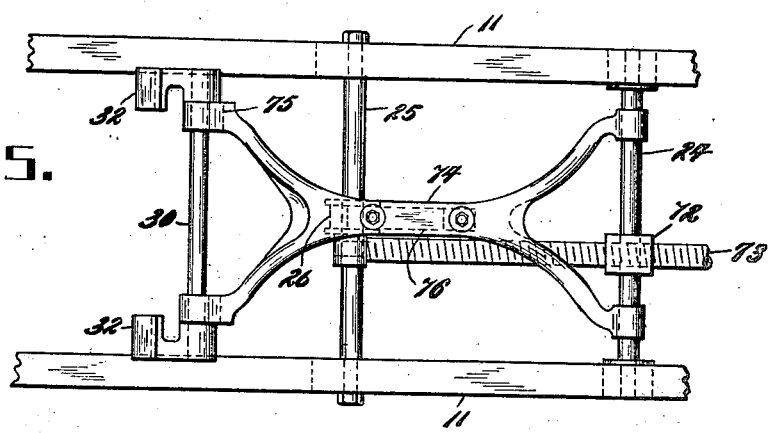
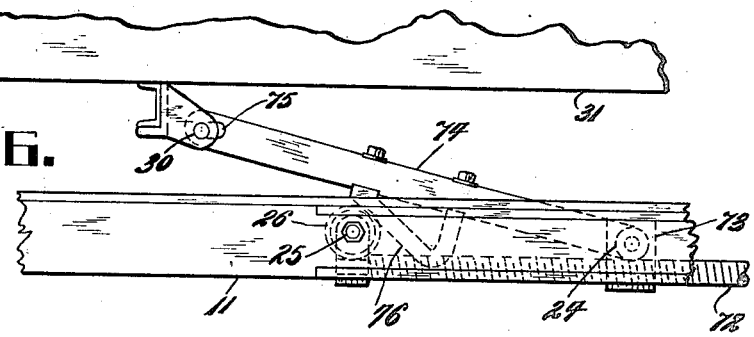
Joseph Gasser
INVENTOR
WITNESS
BY
ATTORNEY

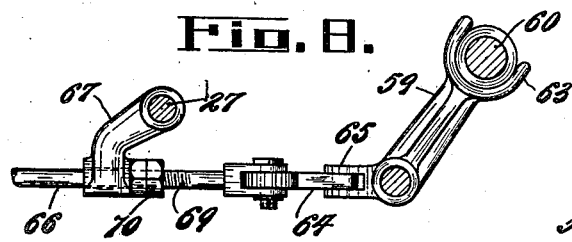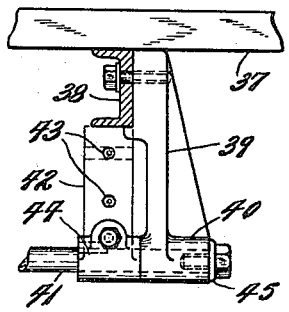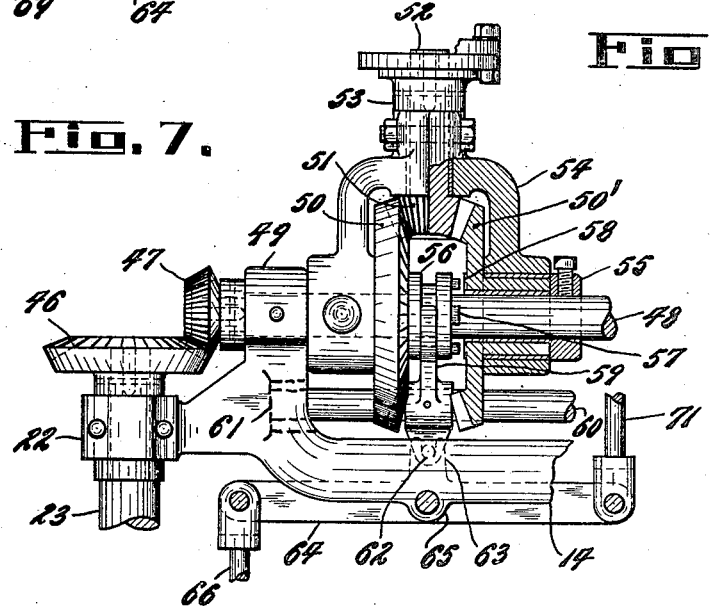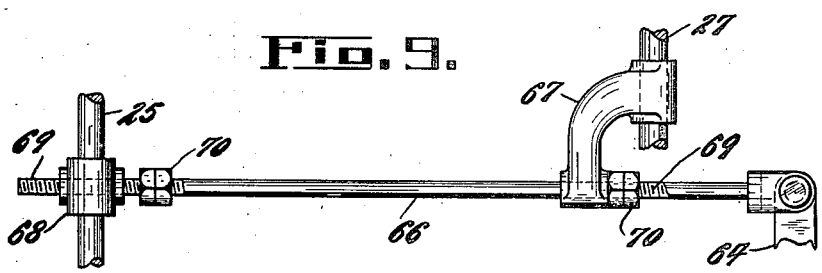

Patented Oct. 17, 1922.

1,431,942

UNITED STATES PATENT OFFICE.

JOSEPH GASSER, OF TRENTON, NEW JERSEY.

DUMP WAGON.

Application filed June 4, 1921. Serial No. 474,873.

*To all whom it may concern:*

Be it known that I, JOSEPH GASSER, a citizen of the United States, residing at Trenton, in the county of Mercer and State of New Jersey, have invented new and useful Improvements in Dump Wagons, of which the following is a specification.

This invention relates to dump wagons and more particularly to that type or form of such wagons which is motor driven, means being associated therewith whereby the dump-box or body is tipped whereby the contents can be promptly discharged and the said dump-box or body returned to normal position.

The present invention is further particularly adapted for use on automobile trucks so that the inclination of the dump-box or body from a normally horizontal to a tilted position can be operated by the truck motor, the mechanism also making provision for the prompt return of the dump-box or body to its normal position on the chassis.

The main object of my present improvement is to provide a novel means for expeditiously and promptly effecting the inclination and return of the dump-box or body from a normally seated position on the chassis to a tilted or dumping inclination, and vice versa.

With the foregoing and other objects in view as will later on be more apparent my invention consists essentially in effecting a primary inclination of the dump-box before the direct dumping thrust is exerted, and in the means for accomplishing the aforesaid inclination and dumping thrust.

In the further disclosure of the invention reference is to be had to the accompanying sheets of explanatory drawings constituting a part of this specification, and in which like characters of reference denote the same or corresponding parts in all the views.

Figure 1 is a plan view showing one practical embodiment of my invention as applied to the chassis of an auto-driven dump-wagon.

Figure 2 is a fragmentary side elevation showing the invention as applied to the dump-wagon, the dump-box or body portion being illustrated in normal position.

Figure 3 is an enlarged transverse section taken approximately on the line 3—3 in Figure 2.

Figure 4 is a similar enlarged transverse section taken on the line 4—4 in Figure 2.

Figure 5 is a plan view of a slightly modified form of the invention.

Figure 6 is a side elevation of the same.

Figure 7 is an enlarged detail of the front cross member and clutch mechanism, parts being broken away or in section for the sake of clearness.

Figure 8 is an enlarged fragmentary detail plan of the automatic knock-out hereinafter fully described; and, Figure 9 is a side view of the same.

Figure 10 is an enlarged detail of one of the dump body hinged connections to the underframe or chassis.

Referring more particularly to the views the numeral 10 designates a vehicle chassis on which is mounted or formed a frame 11 of substantially rectangular configuration, that is to say, it includes side members 12, 12 a rear cross member 13 and a front crossmember 14 which are connected rigidly together in any of the well known ways. The side members 12, 12 conveniently consist of rectangular wood fillers 15 extending forwardly from the rear end of the frame 11 for about half the length thereof, upper and lower metal facing strips 16, 17, Figures 2 and 4, and outer and inner facing strips 18, 19, respectively, which are secured to the aforesaid upper and lower facing strips 16, 17, by button headed screws 20 whereby the forward ends of the side members are made substantially or rectangular box-like formation to constitute longitudinal guides 21. Journaled in appropriate bearings 22, at the rear and forward ends of the longitudinal guides 21 are screw rods 23 on which are threaded blocks 24 of a cross section to be freely movable forwardly or rearwards in said guides as hereafter explained. Mounted transversely of the frame 11 and conveniently carried by the rear bearings 22 is a horizontal shaft 25 on which are freely rotatable rollers 26, and similarly supported by the aforesaid blocks 24 is a second transverse shaft 27 on which are pivoted the forward ends of link members 28 whose rear ends are mounted by elongated slots 29,— the purpose and function whereof will be hereafter fully explained—on the outer ends of a horizontal shaft 30 supported transversely from the underside of the dump-box or body 31 by hangers 32 firmly bolted to a cross channel beam 33. Fixed to the underside of the aforesaid link members 28 are cam-like members or knee pieces 34 conveniently shaped as shown from appropriate stock and having their ends rabbeted at 35 into the underside of said link members 28, cap-screws and lock-washers 36 serving to connect the parts firmly together; or the cam-like members or knee pieces 34 may be formed integral with the link members 28 as will be obvious to those acquainted with the art to which this invention appertains.

The rear end of the dump-box or body 31 is supported on a transverse channel beam 37—Figure 10—beneath which are channel-sections 38 to which are securely attached hinge members or brackets 39 pivotally supported at 40 on the outer ends of a horizontal rod or bar 41, mounted in hangers 42 securely attached to the chassis 10 by cap-screws and lock washers 43, rotation of said rod or bar 41 being prevented by keys 44, a washer and cap-screw 45 being applied at each outer end to prevent the ingress of dust and dirt to the pivotal supporting parts 40.

Keyed or otherwise mounted on the forward ends of the aforesaid screw-rods 23 are suitable spur gears 46 which mesh with gears 47 on a cross shaft 48 journaled in appropriate bearings 49 securely mounted on the forward end of the frame 11, and it will of course be clearly apparent that rotation of the cross-shaft 48 will actuate the gears 47, 46 to rotate the screw-rods 23 so as to move the blocks 24 rearwards or forwardly in the longitudinal guides 21 as will be later on fully explained.

Journaled on the aforesaid shaft 48 are a pair of opposed spur gears 50, 50′ in mesh with a gear 51 keyed or otherwise securely mounted on a shaft 52 appropriately driven from the transmission,—or by any other suitable means from the motor—said shaft 52 having a bearing in the shank 53 of a stirrup 54 in the forked members whereof are formed journals for the aforesaid spur gears 50, 50′ an adjusting and locking collar 55 serving to prevent any displacement longitudinally of the shaft 48. Feathered on the shaft 48 between the spur gears 50, 50′ is a clutch member 56 having opposed teeth 57 adapted to mesh with corresponding teeth 58 on the aforesaid spur gears 50, 50′. Co-operating with a circumferential groove in the clutch member 56 is a shifter 59 feathered and longitudinally slidable on a shaft 60 supported in bearings 61 in the rear of the front cross-member 14, and engaging with a pin 62 thereon are fingers 63 projecting from a laterally disposed lever 64 conveniently pivoted between ears 65 on said cross member 14. Connecting with one end of said lever 64 is a trip rod 66 longitudinally of which traverses an elbow bearing or member 67 depending from the aforesaid shaft 27, and the rear end of said trip rod 66 is screwed into a depending bracket arm 68 collared on or cottered to the shaft 25. It is to be here particularly noted that both ends of the trip-rod 66 are screw threaded at 69 and fitted with lock-nuts 70 which serve as bumpers to trip the knock-out mechanism and thereby automatically move the clutch 56 to neutral when the dump-box or body 31 reaches its limits of movement, said lock-nuts 70 also making provision for accurate adjustments to meet all service conditions. The aforesaid pivoted lever 64 is also made double ended as shown and centrally pivoted so that it can accommodate right or left hand service conditions. A rod or other appropriate connection 71 connects with a suitable operating lever convenient for the truck driver and whereby the clutch 56 is thrown into gear for inclining the dump-box or body 31 for dumping or returning same to the normal position seated on the frame 11, and I wish here to particularly emphasize the importance of the described automatic knock-out mechanism as the same eliminates the employment of but one hand lever for manipulating the dump-box, whilst at the same time it is to be clearly seen that the clutch member 56 alone remains rotating whilst the truck engine is running.

In the modified form of the invention shown by Figures 5 and 6 it will be seen that instead of employing two screw-rods 23 I only make use of one screw-rod 73 which is arranged centrally longitudinal of the frame 11 and on said rod is threaded the block 72 and adapted to be tranversed thereover, as hereinbefore set forth. In this instance it is to be observed that I employ what may be termed a cruciform or double-ended fork member 74, the forward legs whereof are pivoted on the shaft 24 whereas the rear legs are slotted at 75 and mounted on the shaft 30 beneath the dump-box or body 31, a knee piece or cam member 76 being attached to or formed integral with the underside medial portion of the member 74 for co-operation with a roller 26 on the horizontal shaft 25 as before disclosed and particularly described.

The construction and assembly of the several parts having been thus outlined by reference to the several views it will be apparent that when the dump-box or body 31 is resting in a horizontal or the normal position upon the frame 11, and it is desired to incline same to dumping position for the discharge of its contents, the operator or driver of the truck moves the hand-lever—not shown—thus exerting a pull or push upon the rod 71 and oscillating the lever 64 which through the fingers 63, pin 62 and shifter 59 will move the clutch 56 into mesh with the proper spur gear 50 or 50′ to impart motion to the cross-shaft 48, and through the gears 47, 46 to the screw rods 23. Rotation of the screw-rods 23 in the proper direction will result in the traveling or movement rearwards of the blocks 24 towards the rear of the chassis 10 and consequential with this movement the link members 28 will receive an initial rearward travel. This initial rearward movement of the link members 28 due to the provision of the slotted connection at 29 and the travel of the knee pieces 34 upwardly over the rollers 26 results in a primary raising of the front end of the dump-box or body 31 before the thrust of the screw-rods 23 is fully exerted to raise or move the said body 31 to full dumping position, or at an angular inclination of substantially forty-five degrees with respect to the frame 11. As the dump-box or body 31 arrives at the dumping inclination it is to be noted that the elbow bearing 67 contacts with the rear lock-nuts 70 on the trip-rod 66 and moves same longitudinally rearwards whereby the lever 64 is turned on its pivot and through the fingers 63 acts on the shifter 59 to throw the clutch 56 out of gear with the meshed gear 50 or 50' into the neutral or inoperative position. When the dump-box or body 31 is to be returned to its normal position the operator or driver of the wagon moves the aforementioned hand-lever to throw the clutch 56 into mesh with the proper gear 50 or 50' into the neutral or inoperative position. When the dump-box or body 31 is to be returned to its normal position the operator or driver of the wagon moves the aforementioned hand-lever to throw the clutch 56 into mesh with the proper gear 50 or 50' to actuate the screw-rods 23 in a reverse direction which effects the forward travel of the blocks 24 until the elbow bearing 67 strikes the forward lock-nuts 70, and in this manner operates the trip rod 66 to again throw the clutch 56 into neutral as above set forth. The foregoing explanation of the operation of my improved means for actuating the dump-box or body 31 will be clearly understood by those acquainted with the art to which my invention appertains, and although as mentioned heretofore, I particularly apply my invention to vehicles such as one usually finds devoted to the carrying of material which is subsequently to be unloaded or dumped, and with this in mind my device occupies but very little space on the vehicle,-has no cumbersome projections beyond the front and rear of the vehicle body, whilst an exceedingly simple and effective means is provided for readily moving the dump-box or body 31 into and out of dumping positions.

Finally I wish it to be clearly understood that while I have described and shown the best form of my invention at present known to me it will be obvious that various detail changes may be effected and other combinations of the several parts arranged without in any way departing from the spirit of said invention, and it is hereby intended to include all such reasonable changes or other variations as fairly fall within the scope of the appended claims.

Having described my invention, what I claim as new and desire to secure by Letters Patent is:

1. The combination with a vehicle understructure and body of a frame interposed between said understructure and having the body hinged to the rear end thereof, slidable blocks adapted for movement longitudinally in said frame, a shaft coupling said blocks in parallelism, spaced levers pivoted on said shaft connecting with a second shaft mounted beneath the aforesaid hinged body and having a slotted connection therewith, knee-pieces on the underside of the spaced levers, and means for co-operation with said knee pieces for imparting an initial upward inclination to the forward end of the body before the dumping thrust is exerted.

2. The combination with a vehicle understructure and body of a frame interposed between said understructure and having the body hinged to the rear end thereof, slidable blocks adapted for movement longitudinally in said frame, a shaft coupling said blocks in parallelism, spaced levers pivoted on said shaft connecting with a second shaft mounted beneath the aforesaid hinged body and having a slotted connection therewith, knee-pieces on the underside of the spaced levers, spaced rollers mounted on a transverse shaft in the aforesaid frame over which the said knee pieces are traversed to impart an initial upward inclination to the forward end of the body before the dumping thrust is exerted, power actuated reverse mechanism controlling the movement of the slidable blocks, and means for automatically shifting the power reverse mechanism into neutral position as the vehicle body reaches its limit of upward and downward inclination.

3. The combination with a vehicle understructure and body of a frame interposed between said understructure and having the body hinged to the rear end thereof, slidable blocks adapted for movement longitudinally in said frame, a shaft coupling said blocks in parallelism, spaced levers pivoted on said shaft connecting with a second shaft mounted beneath the aforesaid hinged body and having a slotted connection therewith, knee pieces on the underside of the spaced levers, spaced rollers mounted on a transverse shaft in the aforesaid frame over which the said knee pieces are traversed to impart an initial upward inclination to the forward end of the body before the dumping thrust is exerted, power actuated reverse mechanism including freely mounted opposed spur gears having concentric clutch engageable portions, an interposed gear always in mesh with said spur gears, a clutch and shifter for coupling up either of the opposed spur gears for the inclining and declining of the aforesaid body, a fingered lever for co-operation with the clutch-shifter, a trip rod pivoted to one end of the fingered lever and having adjustable stops thereon, and a depending elbow member movable along the trip rod and carried by the aforesaid shaft connecting the longitudinally slidable blocks for automatically engaging the adjustable stops whereby the clutch is moved into neutral position as the vehicle body reaches dumping or normal position, and a manual control for throwing the clutch into gear.

In testimony whereof I affix my signature.

JOSEPH GASSER.